United States Patent Office 3,312,665
Patented Apr. 4, 1967

3,312,665
POLYMERS CONTAINING AROMATIC
SULFONIC ACID GROUPS
John R. Caldwell and Edward H. Hill, Kingsport, Tenn.,
assignors to Eastman Kodak Company, Rochester,
N.Y., a corporation of New Jersey
No Drawing. Filed Nov. 15, 1962, Ser. No. 238,010
18 Claims. (Cl. 260—79.3)

This invention relates to cross-linked polymeric material containing aromatic sulfonic acid groups or salts wherein the polymer chains are attached through methylene bridges to the aromatic aminosulfonic acid nuclei, and to a process for preparing these materials.

The new class of cross-linked polymeric materials are particularly useful as dye mordants and as ion-exchange resins. For example, gelatin and poly(vinyl alcohol) when cross-linked by the process of the invention give products that are useful as mordanting layers in color photographic processes. In addition, the products of the invention may be used as sizing or finishing agents on fibrous materials such as textiles and paper in order to improve the dyeing properties and to reduce the tendency toward static electrification. Certain of the products, when applied to the surface of hydrophobic fibers, impart hydrophilic properties and thus make the fibers more effective for transmitting moisture from the skin. Such fibers are valuable because they are more comfortable especially when fabrics made therefrom are worn next to the skin. Films of hydrophobic polymers, for example, acrylonitrile polymers can also be advantageously treated with the polymeric materials of the invention to improve their antistatic properties.

It is, accordingly, an object of the invention to provide a new class of insoluble, cross-linked materials that contain aromatic sulfonic acid groups or their salts. Another object of the invention is to provide cross-linked gelatin, poly(vinyl alcohol) and other water-soluble polymers that contain permanently attached aromatic sulfonic acid groups or salt groups thereof. Another object is to provide a process for preparing these polymeric materials. Another object is to provide shaped articles of improved dyeable and good antistatic properties. Other objects will become apparent hereinafter.

In accordance with the invention, we prepare the new class of polymeric materials by treating polymeric materials containing active hydrogen atoms such as those present in hydroxyl, carboxyl, amide or sulfonamide groups with methylol derivatives of aromatic aminosulfonic acid salts of the general structures:

(I)
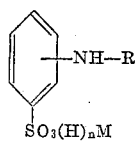

and (II)
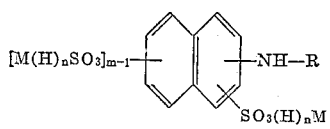

wherein $n$ represents zero when M is a metal ion and 1 when M is a tertiary amine; $m$ represents an integer of from 1–2; R represents H, —CH$_3$, —COCH$_3$,

—CO—CH$_2$—CO—CH$_3$, —CONH$_2$ or

—CO—CH$_2$—CO—NH—C$_6$H$_4$SO$_3$(H)$_n$M and M in each instance represents an alkali metal or polyvalent metal atom, e.g. sodium, potassium, lithium, magnesium, etc., or a molecule of a tertiary organic amine of the aliphatic or aromatic series containing from 3–18 carbon atoms and no other elements than hydrogen and nitrogen, e.g. trimethylamine, triethylamine, tributylamine, triphenylamine, pyridine, quinoline, etc. The compounds where R is —CONH$_2$ are made by heating the aminosulfonic acid with urea or with potassium cyanate. The compounds where R is

—CO—CH$_2$—CO—CH$_3$ are made by treating a salt of the aminosulfonic acid with diketene. The compounds where R is —CO—CH$_2$—CO—NH—C$_6$H$_4$(H)$_n$M are obtained by using appropriate derivatives of malonyl chloride.

All of the above defined aromatic aminosulfonic acid compounds form methylol derivatives, in accordance with the invention, when treated with formaldehyde at a pH of about from 7–10. Ordinarily, from about 0.5–4 moles of the formaldehyde is used per mole of the aromatic aminosulfonic acid salt depending on the number of active hydrogens in the salt compound. The process may be illustrated, for example, by the reaction of N-(sulfophenyl)ureas with formaldehyde to form a mixture of methylol derivatives of the following structures:

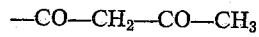

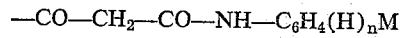

and

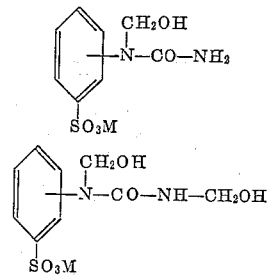

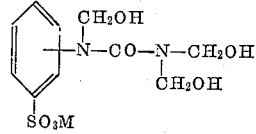

wherein M has the previously defined meaning. The methylol groups in the above compounds become reactive and readily undergo condensations preferably at a pH of about 6 or less. Other of the aromatic aminosulfonic acid salts coming within the invention likewise give mixtures of the corresponding methylol derivatives. The exact proportions of the respective derivatives in each mixture are not susceptible of accurate determination.

In the practice of the invention, the methylol derivatives of the aromatic aminosulfonic acids or salts can be used alone to cross-link certain polymeric materials. However, it is preferred to use the aromatic aminosulfonic acid derivative in admixture with the methylol derivatives of urea or melamine. For instance, a mixture of the aromatic aminosulfonic acid derivative and melamine in water is heated with formaldehyde at a pH of about 7.5–9.0 in order to form a mixture of the methylol derivatives. This mixture is then used for the treatment of polymeric materials. In the presence of an acid catalyst the methylol groups react with hydroxyl groups, amide groups, etc. The mixture can contain from 10 to 90% and preferably 30 to 50% of the aromatic aminosulfonic acid derivative, by weight, the remainder being the methylol derivative of melamine. The proportions can vary widely, but preferably from about 5–50 parts by weight of the methylol derivatives and from 95–50 parts by weight of the polymeric materials to be treated. Suitable curing catalysts are acids that have a dissociation constant of about $1 \times 10^{-5}$ or higher. The free acids or their ammonium or amine salts may be used. However, the free acids tend to cure too fast and, accordingly, are rarely used. Suitable curing acids are represented by acetic, propionic, lactic, oxalic, tartaric, benzoic, phosphoric, toluenesulfonic, sulfuric, and hydrochloric acids. The metal atom stays on through the curing process, since the acid curing catalyst affects only the residual methylol groups. Polymeric materials that may be treated by the process of the invention include both water-soluble and water-insoluble types.

The water-soluble polymers to be treated are converted to insoluble cross-linked structures by the process of the invention. At the same time, the aromatic aminosulfonic acid nucleus (or radical) becomes attached to the polymer through a methylene bridge ($-CH_2-$) so that it is not removed by long contact with water. Suitable watersoluble polymers include proteins such as gelatin, casein, zein, blood proteins and the like. Corn starch, potato starch, gum arabic, agar, alginic acid and other carbohydrate structures can be used. Poly(vinyl alcohol) and partially-hydrolyzed poly(vinyl acetate) can be employed. Some of the most valuable polymers are those types of vinyl polymers that contain amide groups. Such polymers are obtained by the polymerization or copolymerization of the amides of methacrylic acid and acrylic acid. The amides and amide-esters of fumaric acid, maleic acid, and itaconic acid, also can be used. The amide polymers should contain at least 3% of amide hydrogen, on a molar basis. In carrying out the process, the water-soluble polymers can be mixed with the aromatic aminosulfonic acid, methylol derivative in water solution. The curing catalyst is added, and the solution can be coated on various surfaces. The coating is then heated at from about 30–120° C. to evaporate the water and cure the methylol compound. With suitable catalysts, the methylol compound will cure at room temperature.

The water-insoluble polymers that may be advantageously modified by the process of the invention include cellulose in the form of cotton, viscose, cellophane, wood flour and wood pulp. Cellulose esters and ethers may be employed. Vinyl polymers may be treated, such as those derived from acrylate esters, methacrylate esters, vinyl esters, maleic esters, fumaric esters, etc. It is preferred that the vinyl polymers contain at least 3 mole percent hydroxyl groups, amide hydrogen or carboxyl groups, but this is not absolutely necessary. Polyesters, polyamides, polyurethanes, polycarbonates, polyureas and polyformals may be treated by the process with advantage. These water-insoluble polymeric materials may be treated in the form of shaped objects such as fibers, films, molded pieces or small particles. Thus, for example, the methylol derivative can be applied to fibers made of viscose, cotton, cellulose esters, polyesters, polyamides, acrylonitrile polymers, etc. After curing, the coating has excellent adhesion and imparts valuable properties such as improved wettability, dyeability, and antistatic action. The methylol derivative can also be mixed with a solution of the polymeric material in an organic solvent. Under these conditions, the methylol derivative is dispersed as fine particles in the resulting fiber, film or coating. These particles have the property of absorbing dyes, metal ions and moisture.

The following examples further illustrate the manner of practicing the invention.

EXAMPLE 1

One molecular proportion of the lithium salt of sulfanilic acid was dissolved in dimethylsulfoxide and 1.1 molecular proportion of diketene was slowly added while the temperature was maintained at 20–25°. The product was precipitated by pouring the solution into a large volume of acetone or toluene. The product was N-(4-sulfophenyl)acetoacetamide, lithium salt, having the structure

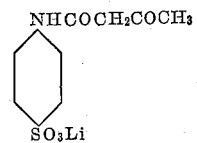

This compound contains three active hydrogen atoms and hence can make a trimethylol derivative by reaction with formaldehyde.

(A) One molecular proportion of the above prepared lithium salt of N-(4-sulfophenyl)acetoacetamide was dissolved in water and four molecular proportions of formaldehyde were added. Sodium carbonate was then added to give a pH of 7.5–8.5 and the solution was stirred at 30–40° C. for 15 minutes. The solution was then adjusted to a concentration of 10% solids. Twenty cc. of the solution was mixed with a solution of 15 g. poly (vinyl alcohol) dissolved in 100 cc. of water. Ammonium chloride (0.4 g.) was added as curing catalyst and the solution was coated on a glass plate. The water was evaporated and the film was heated at 100–110° C. for one hour. The poly(vinyl alcohol) film swelled but did not dissolve in water. The film had a strong affinity for basic dyes. The film had ion-exchange properties. The presence of the sulfonic acid groups made the poly (vinyl alcohol) useful as a mordanting layer in color photography process.

Gelatin was used in place of poly(vinyl alcohol) as described above. The cured film of gelatin, containing attached sulfonic acid groups, had ion-exchange properties. It was useful in photographic processes as a mordant for basic dyes, couplers, and developing agents.

Poly N-isopropylacrylamide was used in place of poly (vinyl alcohol), as described above. The cured film was insoluble in water and had a strong affinity for basic dyes. It also had ion-exchange properties.

(B) Ten g. of the methylol derivative of the lithium salt of N-(4-sulfophenyl)acetoacetamide was mixed with 20 g. of tetramethylol melamine in 300 cc. of water and 1.0 g. of diammonium hydrogen phosphate was added to the solution. Ten cc. of the above solution was added to a solution of 25 g. of poly(vinyl alcohol) in 150 cc. of water. The resulting solution was coated on film base made from polyethylene terephthalate and the water was evaporated. The film was then heated at 100–110° for 30 minutes. The poly(vinyl alcohol) coating had a strong affinity for basic dyes and was insoluble in water. Similar results were obtained when gelatin was used in place of poly(vinyl alcohol).

A copolymer was prepared from 80 parts of N,N-dimethylacrylamide and 20 parts of acrylamide. Twenty g. of the copolymer was dissolved in 150 cc. of water and 15 cc. of the above solution was added. This solution was padded onto fabrics made of polyesters, polyamides, acrylonitrile polymers and cellulose acetate to give an add-on of 2 to 3%, on a dry basis. After curing at 100–110° C. for 30 minutes, the fabrics showed improved wettability and had a reduced tendency to develop static electrification.

The solution (15 cc.) was mixed with a solution of 10 g. corn starch in 50 cc. of water. A film was prepared by coating the solution on a glass plate and evaporating the water. The film was then cured by heating at 90–100° for 30 minutes. The cured film was insoluble in water. It had ion-exchange properties.

(C) Fifty g. of the lithium salt of N-(4-sulfophenyl) acetoacetamide and 50 g. of urea were dissolved in 400 cc. of water. Twenty g. of formaldehyde was added and the solution was adjusted to a pH of 8.0–8.5 by adding sodium borate. The mixture was heated at 60–70° for 30 minutes. It was then cooled to room temperature and 4 g. of ammonium lactate was added as a curing catalyst. This composition was useful for attaching sulfonic acid groups to gelatin, starch and poly(vinyl alcohol) as described in A above. The composition was also useful for impregnating fibrous materials such as textile and paper.

EXAMPLE 2

Thirty g. of the sodium salt of o-aminobenzenesulfonic acid, 50 g. of melamine, thirty g. of formaldehyde and 400 cc. of water were placed in a flask. The pH was adjusted to 7.5–8.5 by the addition of sodium carbonate and the solution was heated at 50–60° for 1 hour. The solution was cooled to room temperature and 3 g. of oxalic acid was added. Ten cc. of this solution was added to a solution of 10 g. of cellulose acetate in 120 cc. of acetone, with rapid stirring. A fine dispersion of the sulfonic acid resin was produced. The dispersion was coated on glass plates and the solvent was evaporated. The film of cellulose acetate contained small particles of the sulfonic acid resin dispersed throughout its cross-section. The film had a strong affinity for basic dyes.

EXAMPLE 3

The sodium salt of sulfanilic acid was treated with malonyl chloride to make N,N'-di(4-sulfophenyl)malonamide, sodium salt of the structure:

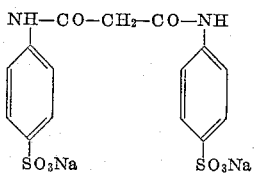

Ten g. of this compound, 8 g. of melamine, 15 g. of formaldehyde and 200 cc. of water were mixed. The pH of the solution was adjusted to 8.0–9.0 with sodium carbonate, and the solution was heated at 70–80° C. for 15 minutes. The solution was cooled to room temperature and 2 g. of ammonium chloride was added.

Ten cc. of the above solution was added to 10 g. of gelatin in 100 cc. of water and a film was cast on a glass plate. After curing at 80–90° C., the gelatin film was insoluble in water and had a strong affinity for basic dyes. Similar results were obtained with poly(vinyl alcohol) and starch.

Ten cc. of the above solution was added to a dope of 15 g. poly(acrylonitrile) in 150 cc. of dimethylformamide. Fibers spun from the dope had improved affinity for basic dyes.

EXAMPLE 4

N-(4-sulfophenyl)urea, potassium salt, was made by heating sulfanilic acid with potassium cyanate. It has the structure:

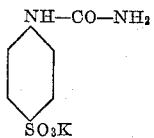

Twenty-five g. of this above compound, 6.3 g. of melamine, 7.5 g. of formaldehyde and 250 cc. of water were mixed. The pH of the solution was adjusted to 8.5–9.5 with sodium carbonate, and the solution was heated at 80° C. for 30 minutes. The solution was cooled to room temperature, and 2 g. of ammonium chloride was added.

Ten cc. of the solution was added to 10 g. of poly(vinyl alcohol) in 100 cc. of water and a film was cast on a glass plate. After curing at 80–90° C., the film was insoluble in water and had a strong affinity for basic dyes. Similar results were obtained with gelatin and starch.

The remaining solution was diluted with water to give a 5% solution and used in the following manner to coat the surface of fibers with polymer. A dope of poly(93% acrylonitrile-7% N-isopropylacrylamide) in dimethylformamide was extruded through a spinneret into a precipitating bath of water-dimethylformamide. The fibers thus formed were then run through a water wash-bath followed by the 5% polymer solution prepared above. The coated fibers were then passed through a heated chamber at 185° C. to dry and cure the resin. The fibers showed an improved dye affinity for basic dyes.

EXAMPLE 5

3-amino-1,5-naphthalenedisulfonic acid, disodium salt was substituted in Example 2 in place of the o-aminobenzenesulfonic acid, and the product obtained was used to treat cellulose acetate to give a film thereof that likewise had strong affinity for basic dyes.

By following the procedures of the above examples, other of the intermediate methylol compositions and cross-linked polymers coming within the scope of the invention can be prepared. For example, any of the aromatic aminosulfonic acid salts coming within above structures I and II can be converted to their corresponding methylol derivatives with formaldehyde, and such compositions can be used to treat polymers such as mentioned above to convert them to cross-linked polymeric materials having the specified utilities. It will also be understood that while the final cross-linked polymeric materials are obtained in salt form, i.e. as an alkali metal, polyvalent or amine salts, they can subsequently be converted to the free acids, esters, and the like.

The invention has been described in detail with particular reference to preferred embodiments thereof, but it will be understood that variations and modifications can be effected within the spirit and scope of the invention as described hereinabove and as defined in the appended claims.

What we claim is:

1. A cross-linked polymeric material comprising the condensation product of (1) a polymer containing active hydrogen atoms selected from the group consisting of a polymer containing hydroxyl groups, a polymer containing carboxyl groups, a polymer containing amide groups and a polymer containing sulfonamide groups, and (2) a methylol derivative selected from the group consisting of (a) a methylol derivative which contains at least one =N—CH₂OH group formed by replacing a hydrogen atom on a nitrogen atom of an aromatic aminosulfonic acid represented by the general formulas:

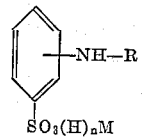

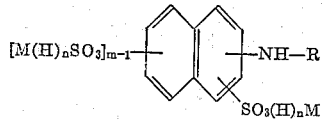

wherein $n$ represents zero when M is a metal ion and 1 when M is a tertiary amine, $m$ represents an integer of from 1 to 2, each R represents a member selected from the group consisting of H, —CH₃, —COCH₃,

—CO—CH₂—CO—CH₃

—CONH₂ and

and each M represents a member selected from the group consisting of an alkali metal ion and a molecule of a tertiary organic amine containing from 3 to 18 carbon atoms, and (b) a mixture of from 10 to 90 percent by weight of the said (a) methylol derivative and from 90 to 10 percent by weight of a methylol derivative selected from the group consisting of a methylol melamine and a methylol urea.

2. A cross-linked polymeric material comprising the condensation product of (1) a water-soluble polymer containing active hydrogen atoms selected from the group consisting of poly(vinyl alcohol), gelatin, casein, zein, gum arabic, agar, alginic acid, starch, polyacrylamide, poly N-isopropylacrylamide, a copolymer of N,N-dimethylacrylamide, a partially hydrolyzed poly(vinyl acetate), and the water-soluble polymeric amides and amide-esters of fumaric, maleic and itaconic acids, and (2) a methylol derivative selected from the group consisting of (a) a methylol derivative which contains at least one

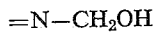

group formed by replacing a hydrogen atom on a nitrogen atom of an aromatic aminosulfonic acid represented by the general formulas:

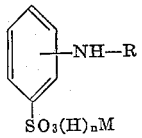

and

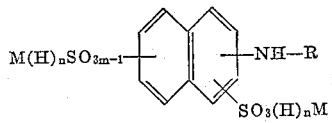

wherein $n$ represents zero when M is a metal ion and 1 when M is a tertiary amine, $m$ represents an integer of from 1 to 2, each R represents a member selected from the group consisting of H, —CH$_3$, —COCH$_3$,

—CO—CH$_2$—CO—CH$_3$

—CHNH$_2$ and

—CO—CH$_2$—CO—NH—C$_6$H$_4$SO$_3$(H)$_n$M and each M represents a member selected from the group consisting of an alkali metal ion and a molecule of a tertiary organic amine containing from 3 to 18 carbon atoms, and (b) a mixture of from 10 to 90 percent by weight of the said (a) methylol derivative and from 90 to 10 percent by weight of a methylol derivative selected from the group consisting of a methylol melamine and a methylol urea.

3. A cross-linked polymeric material comprising the condensation product of (1) poly(vinyl alcohol) and (2) the methylol derivative which contains at least one

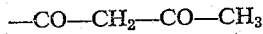

group formed by replacing a hydrogen atom on a nitrogen atom of the lithium salt of N-(4-sulfophenyl) acetoacetamide.

4. A cross-linked polymeric material comprising the condensation product of (1) poly(vinyl alcohol) and (2) a mixture of from 10 to 90 percent by weight of the methylol derivative which contains at least one

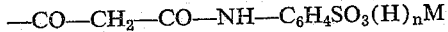

group formed by replacing a hydrogen atom on a nitrogen atom of the lithium salt of N-(4-sulfophenyl) acetoacetamide and from 90 to 10 percent by weight of the methylol derivative of urea.

5. A cross-linked polymeric material comprising the condensation product of (1) cellulose acetate and (2) a mixture of from 10 to 90 percent by weight of the methylol derivative which contains at least one =N—CH$_2$OH group formed by replacing a hydrogen atom on a nitrogen atom of the sodium salt of o-aminobenzenesulfonic acid and from 90 to 10 percent by weight of the methylol derivative of melamine.

6. A cross-linked polymeric material comprising the condensation product of (1) gelatin and (2) a mixture of from 10 to 90 percent by weight of the methylol derivative which contains at least one =N—CH$_2$OH group formed by replacing a hydrogen atom on a nitrogen atom of the disodium salt of N,N'-di-(4-sulfophenyl) malonamide and from 90 to 10 percent by weight of the methylol derivative of melamine.

7. A cross-linked polymeric material comprising the condensation product of (1) starch and (2) a mixture of from 10 to 90 percent by weight of the methylol derivative which contains at least one =N—CH$_2$OH group formed by replacing a hydrogen atom on a nitrogen atom of the potassium salt of N-(4-sulfophenyl) urea and from 90 to 10 percent by weight of the methylol derivative of melamine.

8. A process for preparing a cross-linked polymeric material which comprises reacting at from 20 to 120° C., a mixture comprising (1) a polymer containing active hydrogen atoms selected from the group consisting of a polymer containing hydroxyl groups, a polymer containing carboxyl groups, a polymer containing amide groups and a polymer containing sulfonamide groups and (2) a methylol derivative selected from the group consisting of (a) a methylol derivative which contains at least one =N—CH$_2$OH group formed by replacing a hydrogen atom on a nitrogen atom of an aromatic aminosulfonic acid represented by the general formulas:

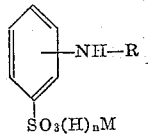

and

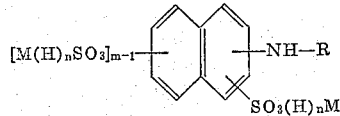

wherein $n$ represents zero when M is a metal ion and 1 when M is a tertiary amine, $m$ represents an integer of from 1 to 2, each R represents a member selected from the group consisting of H, —CH$_3$, —COCH$_3$,

—CO—CH$_2$—CO—CH$_3$

—CONH$_2$ and

—CO—CH$_2$—CO—NH—C$_6$H$_4$SO$_3$(H)$_n$M and each M represents a member selected from the group consisting of an alkali metal ion and a molecule of a tertiary organic amine containing from 3 to 18 carbon atoms, and (b) a mixture of from 10 to 90 percent by weight of the said (a) methylol derivative and from 90 to 10 percent by weight of a methylol derivative selected from the group consisting of a methylol melamine and a methylol urea, in the proportions of from 5 to 50 parts by weight of the said methylol derivative and from 95 to 50 parts by weight of the said polymer.

9. A process for preparing a cross-linked polymeric material which comprises reacting at from 20 to 130° C., in the presence of an acid catalyst, a mixture comprising (1) a water-soluble polymer containing active hydrogen atoms selected from the group consisting of poly(vinyl alcohol), gelatin, casein, zein, gum arabic, agar, alginic acid, starch, polyacrylamide, poly-N-isopropylacrylamide, a copolymer of N,N-dimethylacrylamide and acrylamide, partially hydrolyzed poly(vinyl acetate), and the water-soluble polymeric amides and amide-esters of fumaric, maleic and itaconic acids, and (2) a methylol derivative selected from the group consisting of (a) a methylol derivative which contains at least one =N—CH$_2$OH group formed by replacing a hydrogen atom on a nitrogen atom of an aromatic aminosulfonic acid represented by the general formulas:

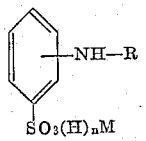

and

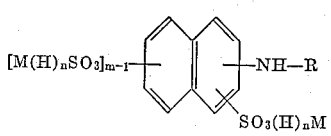

wherein $n$ represents zero when M is a metal ion and 1 when M is a tertiary amine, $m$ represents an integer of from 1 to 2, each R represents a member selected from the group consisting of H, —$CH_3$, —$COCH_3$,

—CO—$CH_2$—CO—$CH_3$

—$CONH_2$ and

—CO—$CH_2$—CO—NH—$C_6H_4SO_3(H)_nM$ and each M represents a member selected from the group consisting of an alkali metal ion and a molecule of a tertiary organic amine containing from 3 to 18 carbon atoms, and (b) a mixture of from 10 to 90 percent by weight of the said (a) methylol derivative and from 90 to 10 percent by weight of a methylol derivative selected from the group consisting of a methylol melamine and a methylol urea, in the proportions of from 5–50 parts by weight of the said methylol derivative and from 95–50 parts by weight of the said water-soluble polymer.

10. A process for preparing a cross-linked poly(vinyl alcohol) which comprises reacting at from 20–120° C. a mixture comprising (1) poly(vinyl alcohol) and (2) the methylol derivative which contains at least one

=N—$CH_2OH$ group formed by replacing a hydrogen atom on a nitrogen atom of the lithium salt of N-(4-sulfophenyl)acetoacetamide, in the proportions of from 5–50 parts by weight of the said methylol derivative and from 95–50 parts by weight of the said poly(vinyl alcohol).

11. A process for preparing a cross-linked poly(vinyl alcohol) which comprises reacting at from 20–120° C. a mixture comprising (1) poly(vinyl alcohol) and (2) a composition of from 10–90% by weight of the methylol derivative which contains at least one =N—$CH_2OH$ group formed by replacing a hydrogen atom on a nitrogen atom of the lithium salt of N-(4-sulfophenyl) acetoacetamide and from 90–10% by weight of the methylol derivative of urea, in the proportions of from 5–50 parts by weight of the said methylol composition and from 95–50 parts by weight of the said poly(vinyl alcohol).

12. A process for preparing cross-linked cellulose acetate which comprises (1) reacting at from 20–120° C. cellulose acetate and (2) a composition of from 10–90% by weight of the methylol derivative which contains at least one =N—$CH_2OH$ group formed by replacing a hydrogen atom on a nitrogen atom of the sodium salt of o-aminobenzenesulfonic acid and from 90–10% by weight of the methylol derivative of melamine, in the proportions of from 5–50 parts by weight of the said methylol composition and from 95–50 parts by weight of the said cellulose acetate.

13. A process for preparing cross-linked gelatin which comprises reacting at from 20–120° C. a mixture comprising (1) gelatin and (2) a composition of from 10–90% by weight of the methylol derivative which contains at least one =N—$CH_2OH$ group formed by replacing a hydrogen atom on a nitrogen atom of the disodium salt of N,N′-di(4-sulfophenyl)malonamide, in the proportions of from 5–50 parts by weight of the said methylol composition and from 95–50 parts by weight of the said gelatin.

14. A process for preparing cross-linked starch which comprises reacting at from 20–120° C. a mixture comprising (1) starch and (2) a composition of from 10–90% by weight of the methylol derivative which contains at least one =N—$CH_2OH$ group formed by replacing a hydrogen atom on a nitrogen atom of the potassium salt of N-(4-sulfophenyl)urea and from 90–10% by weight of the methylol derivative of melamine, in the proportions of from 5–50 parts by weight of the said methylol composition and from 95–50 parts by weight of the said starch.

15. A coating composition comprising (a) a polymer containing active hydrogen atoms selected from the group consisting of a polymer containing hydroxyl groups, a polymer containing carboxyl groups, a polymer containing amide groups and a polymer containing sulfonamide groups, and a methylol derivative selected from the group consisting of (b) a methylol derivative which contains at least one =N—$CH_2OH$ group formed by replacing a hydrogen atom on a nitrogen atom of an aromatic aminosulfonic acid represented by the general formulas:

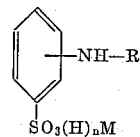

and

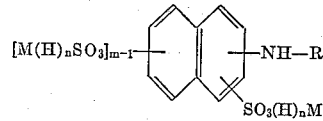

wherein $n$ represents zero when M is a metal ion and 1 when M is a tertiary amine, $m$ represents an integer of from 1 to 2, each R represents a member selected from the group consisting of H, —$CH_3$, —$COCH_3$,

—CO—$CH_2$—CO—$CH_3$

—$CONH_2$ and

—CO—$CH_2$—CO—NH—$C_6H_4SO_3(H)_nM$ and each M represents a member selected from the group consisting of an alkali metal ion and a molecule of a tertiary organic amine containing from 3 to 18 carbon atoms, and (c) a mixture of from 10 to 90 percent by weight of the said (b) methylol derivative and from 90 to 10 percent by weight of a methylol derivative selected from the group consisting of a methylol melamine and a methylol urea.

16. A fibrous sheet material impregnated with the composition of claim 15, and subsequently heated at from 30–120° C. to produce an insoluble, adherent, dye-receptive coating.

17. A film overcoated with the composition of claim 15, and subsequently heated at from 30–120° C. to produce an insoluble, adherent, dye-receptive coating.

18. A fiber treated with the composition of claim 15, and subsequently heated at from 30–120° C. to produce an insoluble, adherent, dye-receptive coating.

References Cited by the Examiner

UNITED STATES PATENTS

| | | | |
|---|---|---|---|
| 2,316,809 | 4/1943 | Peticolas et al. | 260—509 |
| 2,364,033 | 11/1944 | Woodward | 260—509 |
| 2,611,785 | 9/1952 | Gunther | 260—509 |
| 2,843,497 | 7/1958 | Stuckey et al. | 106—287 |
| 3,058,957 | 10/1962 | Breslow | 260—79.3 |
| 3,153,021 | 10/1964 | Tashlick et al. | 260—79.3 |
| 3,163,552 | 12/1964 | Fretscher | 106—287 |

JOSEPH L. SCHOFER, *Primary Examiner.*

JAMES A. SEIDLECK, MORRIS LIEBMAN,
*Examiners.*

D. K. DENENBERG, A. LIEBERMAN,
*Assistant Examiners.*